United States Patent [19]

Pandzik

[11] Patent Number: 4,506,517

[45] Date of Patent: Mar. 26, 1985

[54] AIR CONDITIONING COMPRESSOR UNLOADING CONTROL SYSTEM

[75] Inventor: Richard T. Pandzik, Dayton, Ohio

[73] Assignee: General Motors Corporation, Detroit, Mich.

[21] Appl. No.: 406,127

[22] Filed: Aug. 9, 1982

[51] Int. Cl.³ .......................... F25B 7/00; F04B 49/00
[52] U.S. Cl. .................................. 62/175; 62/228.5; 417/298
[58] Field of Search .............. 62/228.5, 228.3, 323.4, 62/175; 236/1 EA; 417/319, 298

[56] References Cited

U.S. PATENT DOCUMENTS 3,303,988 2/1967 Weatherhead ................ 417/298
4,356,704 11/1982 Izumi et al. .................... 62/323.4
4,391,242 7/1983 Mashio ........................... 62/323.4

*Primary Examiner*—William E. Wayner
*Attorney, Agent, or Firm*—Mark A. Navarre

[57] ABSTRACT

The pumping capacity of an unloadable air conditioning compressor is switched between full and part capacity states. The part capacity state is established during on-/off cycling of the compressor, and air conditioning load conditions are sensed during operation of the compressor to control capacity switching in a manner to provide efficient and responsive performance. Refrigerant pressure at the evaporator outlet is used to control on/off cycling as well as capacity cycling, and the rate of decrease of such pressure is used as an indication of the air conditioning load.

3 Claims, 5 Drawing Figures

AIR CONDITIONING COMPRESSOR UNLOADING CONTROL SYSTEM

This invention relates to air conditioning compressor unloading control systems and more particularly to an unloading control system for a clutch-driven compressor with one or more unloadable cylinders utilizing both evaporator outlet pressure and clutch condition as the control factors for cylinder unloading.

As disclosed in co-pending U.S. patent application Ser. No. 169,598, filed July 17, 1980, now U.S. Pat. No. 4,373,870, entitled "Variable Capacity Positive Displacement Type Compressor", one or more cylinders of a clutchdriven positive displacement type automotive air conditioning compressor may be unloaded to reduce the effective displacement in an efficient manner by utilizing a suction bypass valve that is activated by static working fluid under selective control. With such a compressor, the minimum compressor capacity required determines the number of cylinders to be unloaded, the objective being to leave just enough active cylinders to provide sufficient passenger air cooling under low load conditions for improved fuel economy and to return to full compressor capacity under increased load conditions. It has been discovered that there are certain control objectives which collectively best utilize such variable displacement capability to maximize the improvement in fuel economy. These objectives include: (1) preventing full displacement cycling, i.e., turning the compressor on and off by engagement of the clutch with all cylinders active (none unloaded); (2) maximizing air conditioning performance; (3) minimizing cycling between unloaded and fully loaded states; and (4) permitting continuous operation in the unloaded state so long as the air conditioning performance is satisfactory. It was found that these objectives can be achieved with an automatic control using the following rules to make the decisions:

(1) always start in an unloaded cylinder condition;
(2) remain in such unloaded cylinder condition unless:
 (a) the evaporator pressure is greater than a certain value, and
 (b) the evaporator pull-down rate is slow, and
 (c) the compressor clutch is on:
(3) then switch to full displacement until:
 (a) evaporator pressure is less than a certain value substantially less than that above, or
 (b) the compressor clutch is externally turned off.

As will be disclosed in more detail later, such control can be performed electronically, either by a separate controller or by integrating this function into an engine controller such as is presently available in cars manufactured by the assignee of the present invention. In either case, the control objectives and the strategy are the same, and use is made of a pressure sensor that senses the evaporator outlet pressure, a clutch engagement sensor, and a solenoid valve at the compressor for unloading the desired number of cylinders. Thus, the present control system replaces the conventional pressure cycling switch with a pressure transducer and makes controlled decisions based on the evaporator outlet pressure to load and unload the compressor to best correlate the compressor capacity with cooling demand to thereby maximize the fuel economy improvement.

These and other objects, advantages and features of the present invention will become more apparent from the following description and drawings in which.

Figure 1:
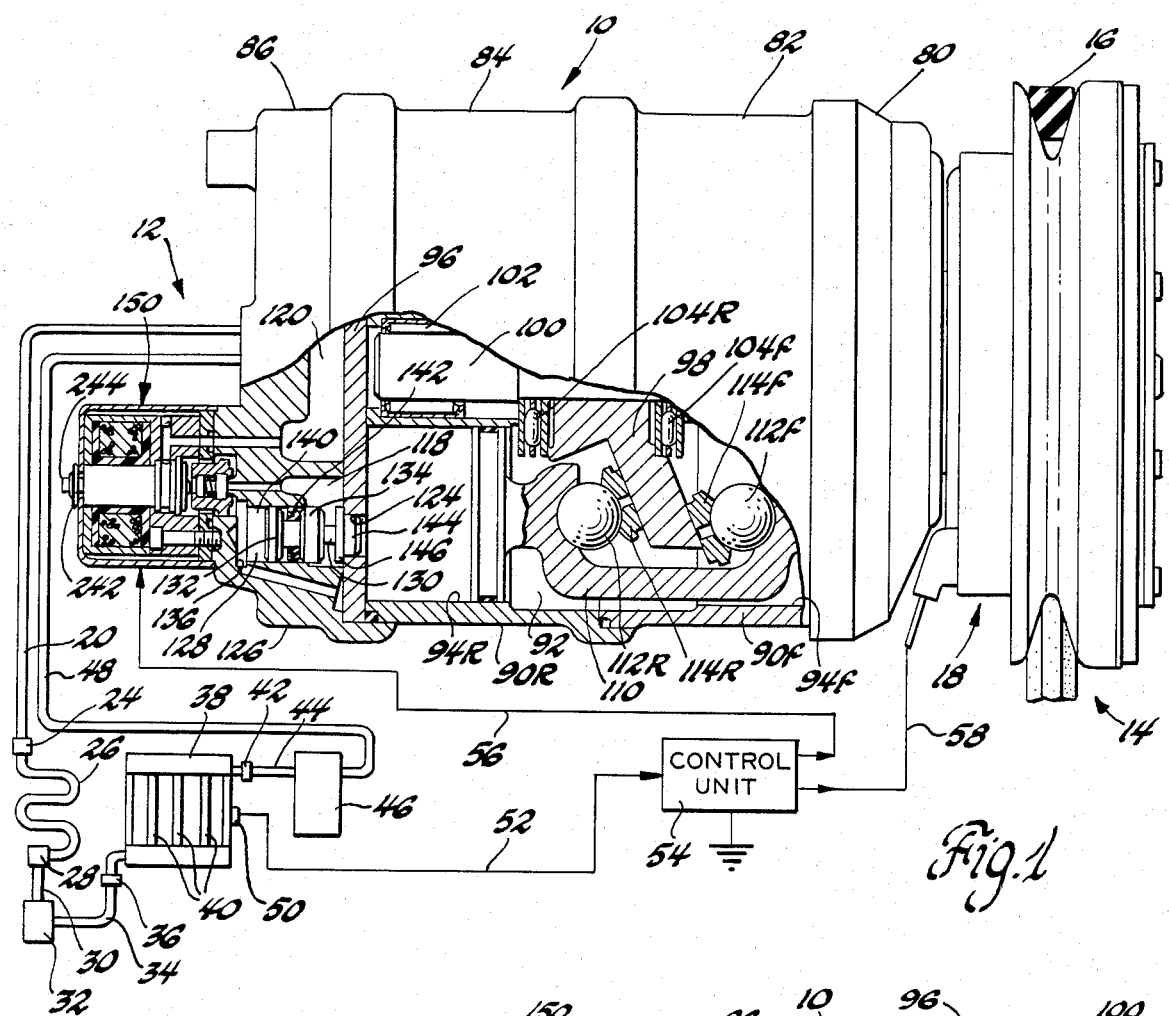
FIG. 1 is a schematic representation of an automotive air conditioning system and control therefor, including a partial section of an unloadable refrigerant compressor, such compressor being shown in its fully loaded state.

Referring now to FIG. 1, reference numeral 10 generally designates a reciprocating piston swashplate type refrigerant compressor intended for automotive use and having incorporated therein a solenoid-operated unloading valve generally designated by reference numeral 12. Apart from solenoid valve 12, compressor 10 is of the type disclosed in detail in co-pending U.S. patent application Ser. No. 169,598 mentioned above, such application being incorporated herein by reference. A pulley assembly 14 rotatably driven by an automotive engine via V-belt 16, is connected to drive compressor 10 through a selectively engageable electromagnetic clutch generally designated by reference numeral 18. Preferably, clutch 18 is of the type disclosed in detail in co-pending U.S. patent application Ser. No. 284,384, filed July 17, 1981, now U.S. Pat. No. 4,428,470, and assigned to the assignee of this invention, such application being incorporated herein by reference.

Compressor 10 is one element of an automotive air conditioning system, and is connected to the other elements in a conventional manner. Particularly, the outlet of compressor 10 is connected via flexible hose 20 to the inlet 24 of condensor 26. Condensor 26 is typically located in a manner to be exposed to a flow of air for cooling and liquifying warm refrigerant discharged from compressor 10. The outlet 28 of condensor 26 is connected via line 30 to an orifice tube-type expander 32 which rapidly decreases the pressure of the liquid refrigerant discharged from condensor 26 to effect rapid cooling of the same. A more detailed description of such orifice tube expander is given in the Scherer U.S. Pat. No. 3,815,379. The outlet of expander 32 is connected via line 34 to the inlet 36 of evaporator 38. Liquid refrigerant in the evaporator 38 is vaporized or boiled in vertical passages or tubes 40 each having fluid conveying passages therein and exterior finned surfaces formed thereon. The evaporator 38 has an outlet 42 which is connected via line 44 to the inlet of accumulator 46. Accumulator 46 separates the liquid and gaseous refrigerant and discharges gaseous refrigerant via suction line 48 to the inlet of compressor 10. A more detailed description of accumulator 46 is given in the Livesay U.S. Pat. No. 4,111,005.

A pressure-to-voltage transducer 50 is located near the outlet of evaporator 38 in a manner to sense the refrigerant pressure thereat. The electrical signal output of transducer 50 is applied via line 52 as an input to control unit 54. Control unit 54 responds to the pressure signal on line 52 and controls the energization of solenoid operated unloading valve 12 via line 56 and of electromagnetic clutch 18 via line 58 in accordance with the control logic of this invention.

In addition to solenoid unloading valve 12, pulley assembly 14 and electromagnetic clutch 18, compressor 10 includes a front head 80, a front cylinder block 82, a rear cylinder block 84 and a rear head 86. Although only a portion of compressor 10 is shown in section in FIG. 1, it will be understood in reference to the following description that front and rear cylinder blocks 82 and 84, as well as the various elements associated therewith are symmetrical about the junction between the two and operate in a similar manner. When both symmetrical elements are visible in FIG. 1, the reference numerals associated therewith are followed by the alphameric suffix F or R to indicate whether the element is associated with the front (F) cylinder block 82 or the rear (R) cylinder block 84, respectively. The cylinder blocks 82 and 84 each have a cluster of three equi-angularly spaced cylinders 90F and 90R, the inboard ends of which are axially spaced from each other, and together with the interior of their shells form a central cavity 92. The respective front and rear cylinders 90F and 90R each have a cylindrical bore 94F and 94R of equal diameter, the bores in cylinder blocks 82 and 84 being axially aligned with each other and closed at their outboard or working end by a valve plate 96.

A swash plate 98 is driven by a shaft 100 that is rotatably supported and axially contained in the cylinder blocks 82 and 84 by a pair of antifriction journal bearings 102 at either end thereof and a pair of antifriction thrust bearings 104F and 104R on either side of swash plate 98. As indicated earlier, compressor drive shaft 100 is driven by the automotive engine via V-belt 16 through pulley assembly 14 and selectively energizable electromagnetic clutch 18. As indicated above, control unit 54 is operative to selectively energize and thereby engage clutch 18 via line 58.

A double ended piston 110 is reciprocally mounted in each pair of axially aligned cylinder bores 94F and 94R, the piston 110 being driven in a conventional manner through balls 112F and 112R and slippers 114F and 114R by the swash plate 98 on rotation thereof.

Suction line 48 enters compressor 10 through an inlet (not shown) in the rear head 86 and passes internally thereof into a rear suction chamber 118 therein and to a front suction chamber (not shown) in front head 80. The refrigerant received in the rear suction chamber 118 is admitted to the working end of the rear cylinder bores 94R through separate suction ports (not shown) in the rear valve plate 96. Opening of such suction ports during the respective piston suction stroke and closure thereof during the piston discharge stroke is effected by separate reed-type suction valves as shown in the above-referenced application Ser. No. 169,598. Similar suction porting and valving is provided at front head 80 between the front cylinder bores 94F and the front suction chamber.

Discharge of refrigerant upon compression thereof in cylinders 90F and 90R is to front and rear discharge chambers 120 in the front and rear heads 80 and 86 through separate discharge ports (not shown) in the respective front and rear valve plates 96. Opening and closing of the discharge ports is effected by separate reed-type suction valves (not shown) as shown in the above-referenced Ser. No. 169,598. The front and rear discharge chambers 120 are internally connected to deliver compressed refrigerant to an outlet (not shown) in rear head 86 which is connected via flexible hose 20 to condensor inlet 24.

The effective displacement or pumping capacity of compressor 10 is simply and efficiently reduced by providing bypass port 124 adjacent one or more of the cylinder suction valves referred to above, and by opening such bypass port to allow free passage of refrigerant into or out of the respective cylinder. The minimum compressor capacity desired determines the number of cylinders which will thus be unloaded. For compressors of the type wherein the lubrication is suspended in the refrigerant (as is the case for the depicted compressor) the minimum compressor capacity must produce enough refrigerant flow to maintain adequate compressor lubrication. Based on such considerations, it has been determined that with the compressor disclosed, it is sufficient to deactivate or unload three of the six cylinders. This is accomplished at each of the three rear cylinders as shown in detail only with respect to cylinder 90R. Referring more particularly to cylinder 90R, circular bypass port 124 is formed in the rear valve plate 96 adjacent to the usual suction valve (not shown) referred to above. When open, bypass port 124 forms a passage between cylinder 90R and rear suction chamber 118, in parallel with the usual suction valve for effectively unloading cylinder 90R. An outwardly extending boss 126 is formed integral with the rear head 86 opposite the bypass port 124 for each rear cylinder, and a valve bore 128 is formed therein which opens to the rear suction chamber 118 and is axially aligned with the respective bypass port 124.

A reciprocable bypass or unloading valve 130 of spool-type construction with spaced lands 132 and 134 of equal diameter is mounted in the valve bore 128. The land 132 cooperates with the closed end 136 of the valve bore 128 to form a valve actuating chamber 140. A seal 142 is mounted on valve 130 between lands 132 and 134 to prevent leakage therepast. The bypass valve 130 is provided at its other end with a land 144 of reduced diameter which is closely received by bypass port 124 as shown in FIG. 1. Annulus 146 formed integral with bypass valve 130 and adjoining land 144 projects radially outward in a manner to seat on the outboard side of valve plate 96 about the bypass port 124 to thereby close the same. Alternatively the bypass valve 130 is movable in the valve bore 128 to the position shown in FIG. 2 where the valve land 144 is completely removed from bypass port 124 and the annulus 146 is disengaged from rear valve plate 96 to fully open the bypass port 124 and thus unload the cylinder 90R. To provide for the most efficient bypass flow, the bypass port 124 is provided with a cross-sectional area equal to or greater than that of the usual suction valve (not shown).

The bypass or unloading valves 130 in all rear cylinders are operated as slaves by a single solenoid-operated master control valve generally designated by reference numeral 150. The following description of master control valve 150 is best seen in reference to FIG. 2 wherein such valve is depicted in an expanded scale. The various control valve components of master control valve 150 are housed within cup-shaped housing 152 which is fastened to rear head 86 about shunt plate 154. Shunt plate 154 bears directly against a flat face 156 on the rear head 86 and an annular solenoid core housing 158 disposed within housing 152 is fastened to shunt plate 154 with a plurality of cap screws 160 (only one of which is shown) which extend through the shunt plate 154 and into rear head 86.

A plunger assembly 164 is slidably mounted in a central bore 166 of shunt plate 154 and comprises a hollow cylindrical plunger 168 and a pair of seal discs 170 and 172 disposed therein. Disc 170 is fixed in one end of plunger 168 by a swagging operation and disc 172 is axially movable in the opposite end thereof against a coil spring 174 that is compressively loaded between the discs 170 and 172. The plunger end with the fixed seal disc 170 is received on one side of the shunt plate 154 in circular cavity 176 while the other plunger end with the spring-biased seal disc 172 is received on the other side of shunt plate 154 in a circular cavity 178.

Figure 2:
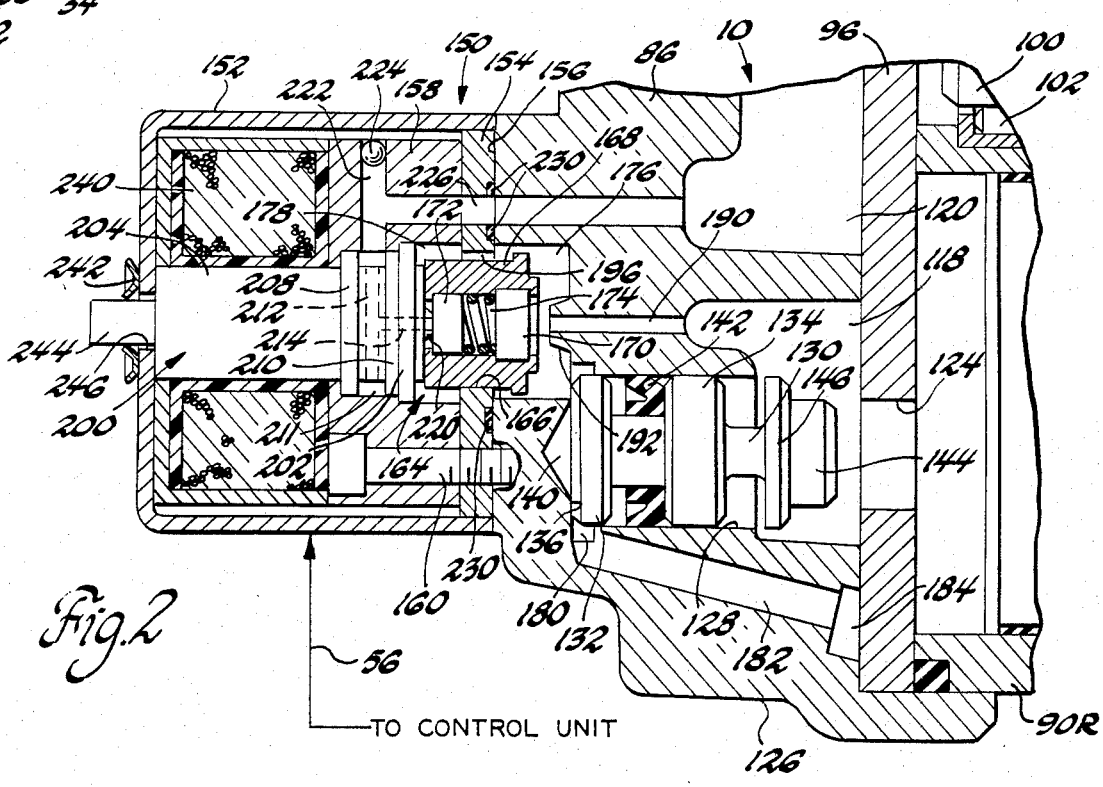
FIG. 2 is an enlarged view taken from FIG. 1 showing the compressor in its unloaded state.

The circular cavity 176 is continuously open to valve actuating chamber 140 as shown in FIG. 2 via an annular recess 180 therein which intersects a portion of cavity 176. Cavity 176 is also in continuous communication with the valve actuating chambers of the other unloading valves via the recess 180, a bored passage 182, a connecting annular groove 184, and separate branch passages (not shown) leading from such annular groove 184 to the other valve actuating chambers. The plunger cavity 176 is selectively openable to rear suction chamber 118 via a valve passage 190 in the rear head which extends centrally through a raised valve seat 192 projecting into the plunger cavity 176. The valve seat 192 is engageable by the seal disc 170 as shown in FIG. 1 to block or close off the rear suction chamber 118 from the valve actuating chamber 140 at the valve passage 190 or to permit communication therewith when plunger assembly 164 is in the position depicted in FIG. 2.

Circular cavities 176 and 178 are connected past plunger assembly 164 via three equi-angularly spaced grooves 196 (only one being shown in FIG. 2) in the bore 166 of shunt plate 154.

A solenoid core 200 is mounted in the solenoid core housing 158 and has a flanged land 202 which seats against the housing to close plunger cavity 178, and a cylindrical portion 204 which projects outwardly from the solenoid core housing 158. The core 200 additionally has a pair of equal diameter spaced lands 208 and 210 which are received in a counterbore 211 of core housing 158. Lands 202, 208 and 210 are integral with cylindrical portion 204, such lands and cylindrical portion being secured to the solenoid core housing 158, such as by soldering. A cross-drilled passage 212 in solenoid core between the lands 208 and 210 is intersected by an axially drilled passage 214 that projects centrally through a raised valve seat 220 formed on the end of core 200 opposite disc seal 172. Passage 212 is open in the counterbore 211 to a drilled passage 222 in core housing 158 that is closed at its outer end by a press fitted ball 224 and connects intermediate its length with a passage 226 to the compressor rear discharge chamber 120.

Disc seal 172 is engageable with the valve seat 220 as shown in FIG. 2, to block or close off rear discharge chamber 120 from the valve actuating chambers 140 at the valve passage 214, or to permit such communication via the interconnected plunger cavities 176 and 178 on rightward movement of plunger assembly 164 as shown in FIG. 1. A gasket 230 mounted in an inner face of shunt plate 154 extends around plunger cavity 176 and passage 226 to seal the same at the face 156 of rear head 86.

A solenoid coil 240 completes the valve assembly and is disposed about cylindrical portion 204 of core 200 between the core housing 158 and the closed end of valve housing 152. Coil 240 and valve housing 152 are held in place by a clinching type nut 242 received on a smaller diameter cylindrical extension 244 of core 200 projecting through a central opening 246 in the closed end of valve housing 152. As indicated above, solenoid coil 240 is energizable by control unit 54 via line 56 as schematically shown in FIGS. 1 and 2.

The master and slave valve operations for alternately producing loaded or unloaded compressor capacity will now be described. When electromagnetic clutch 18 is engaged to operate compressor 10 and solenoid coil 240 is de-energized, refrigerant at discharge pressure from rear discharge chamber 120 is delivered via passages 226, 222, 212 and 214 to cavity 178 where it acts to force plunger assembly 164 to the right, seating disc 170 on valve seat 192, and thus closing off valve passage 190 from rear suction chamber 118. The rear discharge chamber 120 is then connected through grooves 196 in shunt plate 154 and thus via cavity 176 to the valve actuating chamber 140 of bypass valve 130 as shown in FIG. 1, and thence to the valve actuating chambers of the other bypass valves. The surface area of bypass valve land 132 is substantially larger than the surface area of bypass valve land 144 at the bypass port 124 so that the closing force exerted on valve 130 by the discharge pressure in valve actuating chamber 140 substantially exceeds the opening force exerted by the same pressure directed from cylinder 94R. The resultant force thus seats annulus 146 of valve 130 against valve plate 96 and thereby seals bypass port 124. During subsequent operation of compressor 10, the pressure or force tending to close valve 130 remains in effect so that the cylinder 90R provides pumping operation at full capacity in the normal manner.

Alternatively, when reduced pumping capacity is desired, the rear cylinders 90R are unloaded by energizing the solenoid coil 240, thereby attracting plunger assembly 164 toward solenoid core 200. Such movement forces disc seal 172 against valve seat 220 and moves disc seal 170 off valve seat 192. As a result, the passage between rear discharge chamber 120 and valve actuating chamber 140 is blocked, and the passage between rear suction chamber 118 and valve actuating chamber 140 is opened. In such case, the opening force exerted on land 144 during a compression stroke of piston 110 overcomes the closing force exerted on valve land 132 causing valve 130 to open bypass port 124 as shown in FIG. 2. With bypass port 124 fully opened, the gaseous refrigerant displaced by subsequent strokes of piston 110 is simply displaced through the open bypass port 124 to rear suction chamber 118 thereby effectively eliminating any pumping effect by the cylinder 90R.

As indicated above, each cylinder 90R in rear cylinder head 84 has a bypass valve 130 and bypass port 124 associated therewith, such valves being operated in unison as slaves according to the position of plunger assembly 164. Thus, the unloading action of cylinder 90R described above applies to all cylinders in rear cylinder block 84 so that energization of solenoid coil 240 operates to unload one-half of the compressor cylinders. It will further be understood that the number of cylinders selected for unloading determines the minimum compressor capacity and that such minimum capacity is selected to provide sufficient passenger cooling at low loads and also sufficient refrigerant flow for adequate lubrication of the compressor moving parts using oil suspended in the refrigerant. In the disclosed embodiment, it was determined that unloading of all three rear cylinders produced the results desired. In other applications, more or less than three cylinders might be unloaded.

According to the present invention, improved compressor capacity control using the master control valve 150 and bypass control valves 130 described above is provided automatically by control unit 54. The control objectives and strategy are described in reference to the six-cylinder compressor depicted in FIGS. 1 and 2 wherein the rear three cylinders are unloadable. In such case, the objectives for the controller are:

(1) to prevent six-cylinder cycling;
(2) to maximize air conditioning performance;
(3) to minimize three-six-three cycling; and
(4) to permit continuous three-cylinder operation so long as the air conditioning performance is satisfactory.

The basic strategy employed is to replace the conventional pressure cycling switch for the clutch 18 with an electronic pressure transducer 50 and to make controlled decisions based on the outlet pressure of evaporator 38. For this purpose, transducer 50 is mounted near the outlet 42 of evaporator 38 in a manner to communicate with the pressure thereat.

Figure 5:
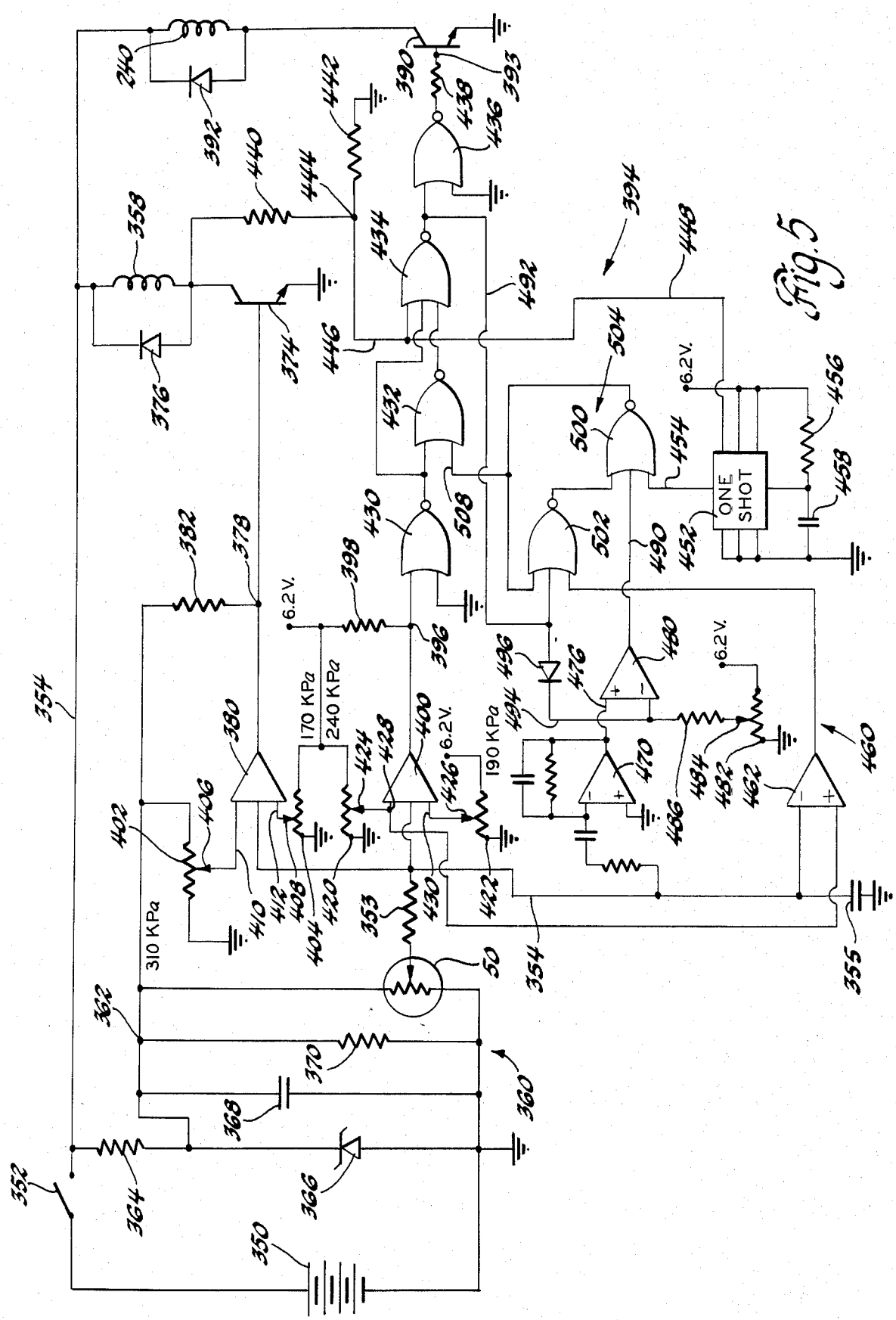
FIG. 5 is a circuit diagram of an electronic controller for carrying out the control logic according to the present invention.

As will be seen in reference to FIG. 5, control unit 54 contains suitable logic elements for controlling the energization of solenoid coil 240 and electromagnetic clutch 18 in a manner to achieve the control objectives listed above. More specifically, the logic elements in control unit 54 control the operation of compressor 10 according to the following rules:

(1) always start on three cylinders (unloaded state);
(2) remain on three cylinders unless:
  (a) the evaporator pressure is greater than a predetermined high value (250 kPa, for example); and
  (b) the evaporator pull-down rate is slower than a reference rate (10 kPa/sec, for example); and
  (c) the compressor clutch is engaged;
(3) then switch to six cylinders (fully loaded) until:
  (a) the evaporator pressure is less than a predetermined low value substantially below that in (a) above (190 kPa, for example); or
  (b) the compressor clutch is disengaged.

Figure 3:
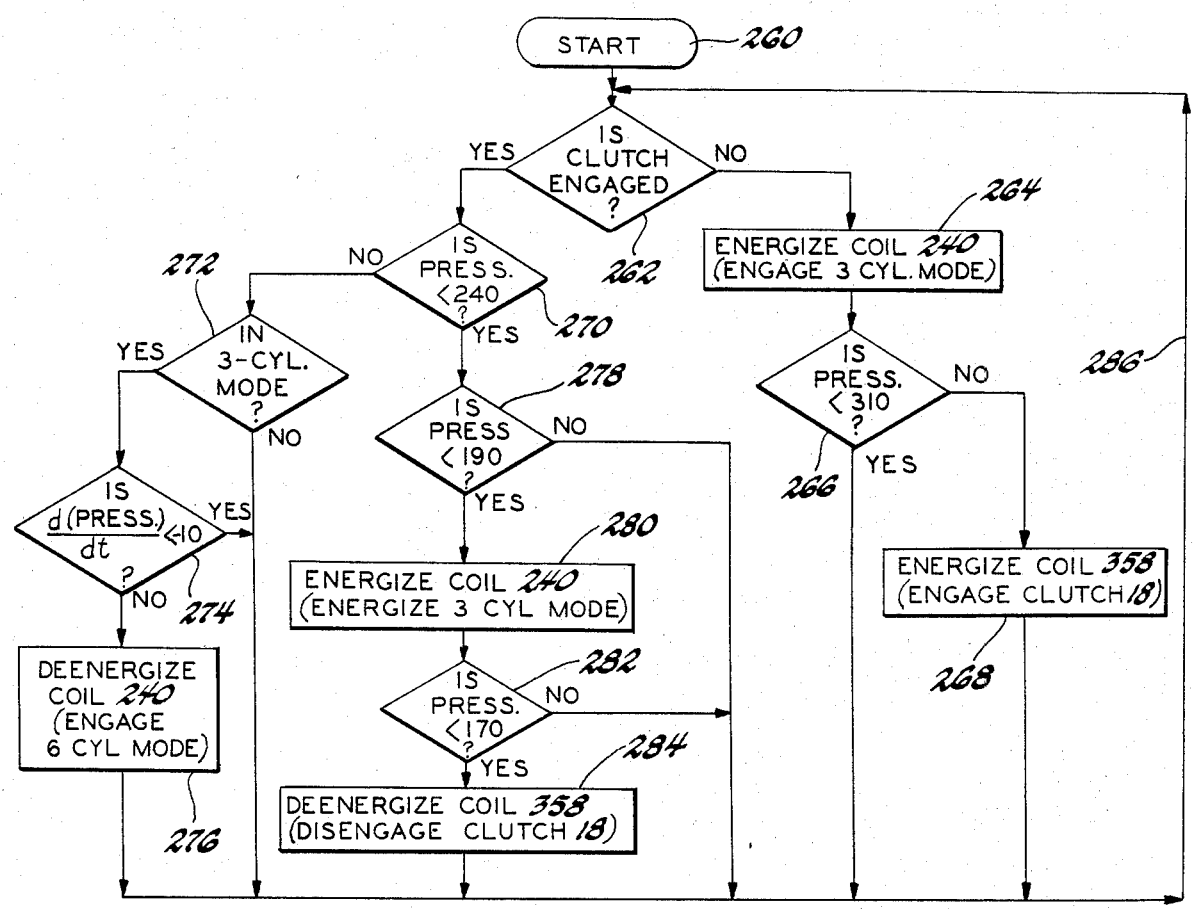
FIG. 3 is a flow diagram of the compressor capacity control logic according to the present invention.

A flow diagram for implementing the logic rules stated above is given in FIG. 3. When the air conditioning system is initially enabled, execution of the flow diagram begins at the Start block designated by reference numeral 260. It is first determined if the compressor electromagnetic clutch 18 is engaged, as indicated at block 262. If not, solenoid coil 240 is energized to open bypass ports 124, as indicated at block 264. Such action ensures that when clutch 18 is engaged, compressor 10 will be in the unloaded or three-cylinder mode of operation, thus satisfying logic rule (1). It is then determined if the evaporator outlet pressure (PRESS) is less than 310 kilo Pascals (kPa), as indicated at block 266. If so, no action is taken. If not, the compressor clutch 18 is engaged (by energizing coil 358, described below in reference to FIG. 5) to commence compressor operation, as indicated at block 268.

If at block 262 it is determined that the compressor clutch 18 is engaged, it is then determined if the evaporator outlet pressure is less than 240 kPa, as indicated at block 270. If so, no action is taken. If not, it is then determined if solenoid coil 240 is energized to engage the three-cylinder mode of operation, as indicated at block 272. If not, no action is taken. If so, the rate of the change of evaporator pressure is determined and compared to a reference rate ($-10$ kPa/second), as indicated at block 274. The negative sign of the reference rate indicates that the pressure is decreasing. If the actual evaporator pressure pull-down rate is faster than the reference rate, no action is taken. If the pull-down rate is slower than the reference rate, solenoid coil 240 is de-energized to block bypass ports 124, thereby engaging the six-cylinder mode of operation as indicated at block 276.

If at block 270 it is determined that clutch 18 is engaged and that the evaporator outlet pressure is less than 240 kPa, it is then determined as indicated at block 278 if the evaporator outlet pressure is less than 190 kPa. If not, no action is taken. If so, solenoid coil 240 is energized to open bypass ports 124 to thereby engage the three-cylinder mode of operation as indicated at block 280. It is then determined if the evaporator pressure is less than 170 kPa as indicated at block 282. If not, no action is taken. If so, compressor clutch 18 is de-energized to terminate compressor operation as indicated at block 284.

The logic decisions described above are repeatedly executed as indicated by return flow line 286 as long as the air conditioning system is enabled. In this manner, the engagement of clutch 18 and the capacity of compressor 10 is cycled in a manner to satisfy the load conditions determined according to the evaporator outlet pressure. Accordingly, the cycling sequence is not fixed but varies depending on the cooling load.

Figure 4:
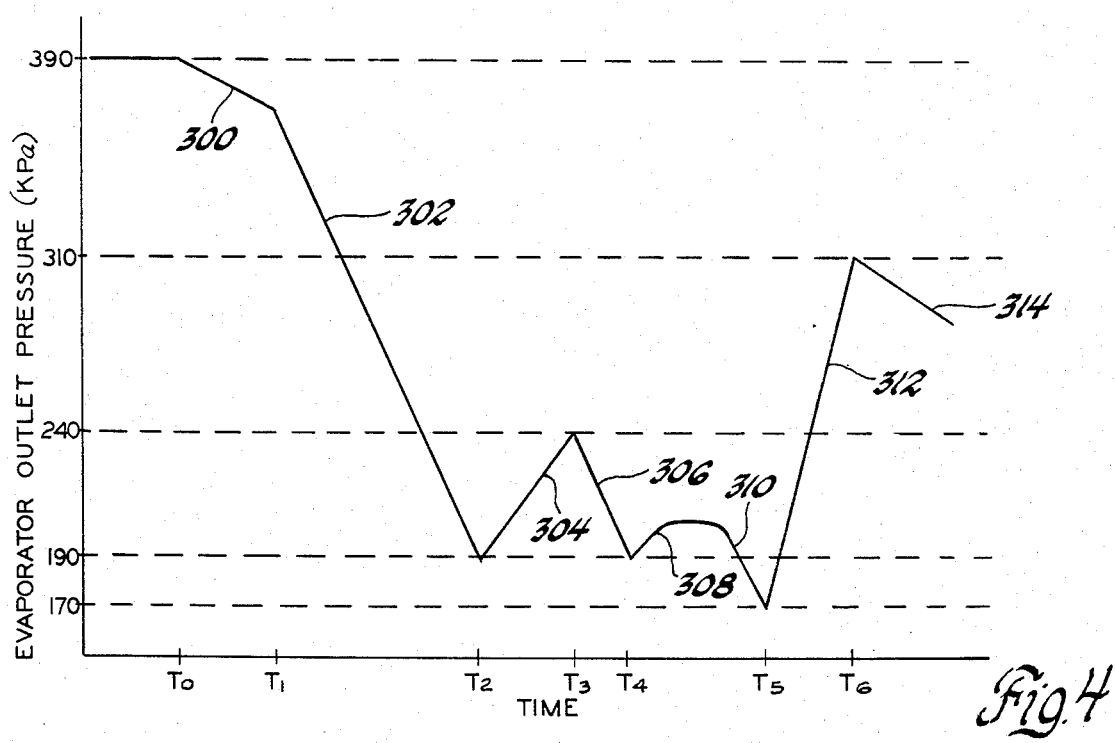
FIG. 4 is a graph of the control logic according to the present invention.

By way of example, FIG. 4 illustrates a period of compressor operation for a given load condition. In such Figure, evaporator outlet pressure is graphed as a function of time beginning at time $T_0$ when the air conditioning system is initially enabled. At such point, the evaporator outlet pressure is at a relatively high value, such as 390 kPa. At time $T_0$, control unit 54 energizes solenoid coil 240 to engage the three-cylinder mode of operation and engages compressor clutch 18 to commence compressor operation. Accordingly, evaporator outlet pressure begins to decrease as designated by reference numeral 300. At time $T_1$, control unit 54 determines that the rate of pressure pull-down is slower than the reference rate of $-10$ kPa/second, and solenoid coil 240 is de-energized to engage the six-cylinder mode of operation. Such action produces a faster pressure pull-down rate as designated by reference numeral 302, and six cylinder or full displacement operation is continued until the evaporator outlet pressure falls below 190 kPa at time $T_2$. At such time, control unit 54 energizes solenoid coil 240 to re-engage the three-cylinder mode of operation.

Depending upon the cooling load, continued operation at the unloaded or three-cylinder capacity may be sufficient to satisfy cooling requirements. However, for the load conditions depicted in FIG. 4, the three cylinder or unloaded capacity is insufficient to satisfy such requirements and the evaporator outlet pressure increases as designated by reference numeral 304 until such pressure reaches 240 kPa at time $T_3$. At such time, control unit 54 de-energizes solenoid coil 240 to engage the six-cylinder mode of operation and consequently, the evaporator outlet pressure decreases as designated by reference numeral 306 until such pressure falls below 190 kPa at time $T_4$. At such time, control unit 54 re-energizes solenoid coil 240 to engage the three-cylinder mode of operation and consequently, the evaporator outlet pressure begins to rise as designated by reference numeral 308. The above-described operation of cycling between three and six-cylinder modes of operation may continue until the cooling demand changes or until the air conditioning system is disabled. For the purposes of illustration, however, it will be assumed, in reference to graph 4, that the cooling demand decreases at time $T_4$ so that the evaporator outlet pressure levels off and then decreases as designated by reference numeral 310. When the evaporator outlet pressure decreases below 170 kPa at time $T_5$, compressor clutch 18 is disengaged to terminate compressor operation. At such time, the evaporator outlet pressure rises as indicated by reference numeral 312 until it reaches 310 kPa at time $T_6$, whereupon control unit 54 re-engages compressor clutch 18 to begin further compressor operation.

FIG. 5 depicts a circuit diagram for control unit 54 and the various input and output devices connected thereto. Circuit elements that appear in both FIGS. 1 and 5, such as pressure transducer 50 and solenoid coil 240, have been assigned the same reference numerals.

Battery 350 supplies energization current at its terminal voltage through switch 352 and line 354 to solenoid coil 358 of electromagnetic clutch 18 and to solenoid coil 240 of compressor unloading valve 12. A voltage regulator, designated generally by reference numeral 360, provides a second lower voltage potential at terminal 362 for supplying power to pressure transducer 50 and to the devices internal to the control unit 54. Specifically, voltage regulator 360 comprises a serially connected resistor 364 and Zener diode 366 connected in parallel across battery 350, and a filter network comprising capacitor 368 and resistor 370 connected in parallel with Zener diode 366. According to the preferred embodiment of this invention, battery 350 is a twelve-volt automotive storage battery and the second regulated voltage provided at terminal 362 is approximately 6.2 volts.

Switch 352 represents an air conditioning selector switch for selectively enabling or disabling the automotive air conditioning system, such switch being in series with a conventional ignition switch (not shown).

Pressure-to-voltage transducer 50 is schematically depicted as a variable resistance element connected between terminal 362 and ground potential. The resistance value, and hence the output voltage applied through resistor 353 to line 354 varies as a function of the evaporator outlet pressure. Capacitor 355 connects line 354 to ground potential for filtering out high frequency noise.

The energization circuit for solenoid coil 358 includes storage battery 350 and a Darlington transistor 374. A conventional free-wheeling diode 376 is connected in parallel with coil 358 for circulating the inductive energy stored therein when transistor 374 is biased from its conducting state to its nonconducting state. Transistor 374 is selectively biased to its conductive and nonconductive states according to the voltage level at terminal 378 which is determined according to the output condition of comparator circuit 380. A resistor 382 connected between terminal 362 and terminal 378 provides external biasing current for transistor 374, and circuit 380 operates in a manner to be described to selectively sink such biasing current to thereby control the conduction of transistor 374.

The energization circuit for coil 240 includes battery 350 and Darlington transistor 390. A conventional free-wheeling diode 392 is connected in parallel with coil 240 to circulate inductive energy stored therein when transistor 390 is biased from a conductive state to a non-conductive state. Transistor 390 is selectively biased to its conductive and nonconductive states according to the voltage level at terminal 393, which voltage is determined in part by the logic circuitry, generally designated by reference numeral 394, and in part by the voltage potential at terminal 396. A resistor 398 connected between the 6.2 volt terminal 362 and terminal 396 normally operates to maintain terminal 396 at a logic 1 voltage potential. Comparator circuit 400 operates in a manner similar to comparator circuit 380 to selectively sink current through resistor 398 to thereby lower terminal 396 to ground potential.

Comparator circuits 380 and 400 are each CA3098 programmable Schmitt triggers, manufactured by RCA Corporation, Somerville, N.J. Each comprises a pair of differential amplifiers adapted to compare an input signal, such as the evaporator outlet pressure signal on line 354 to an upper reference voltage and a lower reference voltage. The differential amplifier outputs are summed to control the state of an internal flip/flop the output of which is applied to an internal driver circuit for sinking an externally supplied biasing current.

Referring to comparator circuit 380, potentiometers 402 and 404 determine the upper and lower reference voltages respectively. Each potentiometer 402 and 404 is connected between the 6.2 volt source and ground potential, the position of the respective potentiometer tap 406 and 408 being movable to adjust the voltage potential on input lines 410 and 412, respectively. As indicated in FIG. 5, tap 406 on potentiometer 402 is adjusted so that the voltage on input line 410 corresponds to 310 kPa, while tap 408 on potentiometer 404 is adjusted so that the voltage on input line 412 corresponds to 170 kPa. Whenever the evaporator output pressure on line 354 is equal to or less than 170 kPa, circuit 380 operates to sink current from resistor 382 to bias transistor 374 to its nonconductive state. This condition is maintained until the evaporator outlet pressure signal on line 354 equals or exceeds 310 kPa, at which time the output of circuit 380 switches to a high impedance state permitting transistor 374 to be driven to the conductive state through resistor 382. This condition in turn, is maintained until the evaporator outlet pressure signal on line 354 becomes equal to or less than 170 kPa, at which time circuit 380 again sinks the bias current through resistor 382. In view of the above, it will be seen that solenoid coil 358 of electromagnetic clutch 18 is energized to engage the same whenever the evaporator outlet pressure is above 310 kPa and is de-energized to disengage clutch 18 whenever the evaporator outlet pressure is lower than 170 kPa.

Potentiometers 420 and 422 establish the upper and lower reference voltages, respectively, for comparator circuit 400. Each potentiometer 420 and 422 is connected between the 6.2 volt source and ground potential, the position of the respective potentiometer tap 424 or 426 being movable to adjust the voltage on input lines 428 and 430, respectively. As indicated in FIG. 5, tap 424 is adjusted to provide a reference voltage on input line 428 that corresponds to 240 kPa, and tap 426 is adjusted to provide a voltage on input line 430 that corresponds to 190 kPa. In operation, resistor 398 and comparator circuit 400 operate to control the voltage at terminal 396 as follows. Whenever the evaporator outlet pressure on line 354 is at or less than 190 kPa, comparator circuit 400 sinks current through resistor 398 to lower terminal 396 to a logic 0 voltage potential. Such condition is maintained until evaporator outlet pressure equals or exceeds 240 kPa at which time the output of comparator circuit 400 opens permitting resistor 398 to pull up terminal 396 to a logic 1 voltage potential. Such condition is maintained until the evaporator outlet pressure again falls to 190 kPa or less at which time comparator circuit 400 sinks the current through resistor 398 to lower terminal 396 to a logic 0 voltage potential.

In view of the above, it will be understood that terminal 396 is at a logic 0 voltage potential whenever the evaporator outlet pressure is at or less than 190 kPa and is at a logic 1 voltage potential whenever the evaporator outlet pressure is at or greater than 240 kPa. As indicated earlier, the voltage potential at terminal 396 in part controls the conduction of transistor 390 and hence, the loading and unloading of compressor 10. The logic circuitry designated by reference numeral 394 additionally controls the conduction of transistor 390 according to further conditions, such as the engagement of electromagnetic clutch 18 and the rate of evaporator outlet pressure pull-down.

Terminal 396 is connected through logic gates 430–436 and resistor 438 to terminal 393 for controlling the conduction of transistor 390. NOR gates 430 and 436 operate as inverters while NOR gates 432 and 434 operate to either pass or modify the logic level at terminal 396 in response to the further conditions referred to above. More particularly, NOR gate 434 operates to bias transistor 390 to a conductive state when the compressor electromagnetic clutch 18 is not engaged, so that the three-cylinder mode of operation is in effect when the clutch 18 is initially engaged; and NOR gate 432 is effective a predetermined time following initial engagement of clutch 18 to switch from the three-cylinder mode to the six-cylinder mode if the evaporator pressure pull-down rate is less than a reference rate.

The engagement of electromagnetic clutch 18 is detected by a voltage divider comprising serially connected resistors 440 and 442 connected between the collector of transistor 374 and ground potential. When transistor 374 is nonconductive, signifying disengagement of electromagnetic clutch 18, the junction 444 between resistors 440 and 442 is at a logic 1 voltage potential. When transistor 374 is conductive, signifying engagement of electromagnetic clutch 18, junction 444 is at a logic 0 voltage potential. Junction 444 is connected via line 446 as an input to NOR gate 434 thereby ensuring that transistor 390 is biased to a conductive state to unload the rear cylinders of compressor 10 when clutch 18 is not engaged. As a result, compressor 10 must be in the three-cylinder mode of operation when the clutch 18 is initially engaged.

Junction 444 is further connected via line 448 to one shot 452. One shot 452 is a conventional multivibrator and operates in response to a negative transition on line 448 (at initial clutch engagement) to produce an output signal on line 454, such output signal having a duration determined by the time constant of resistor 456 and capacitor 458. As will later become apparent, such output pulse serves to delay a shift from three-cylinder operation to six-cylinder operation as depicted at time $T_1$ in FIG. 3 until a predetermined time (such as 2 seconds) following initial compressor clutch engagement.

The circuit for determining the rate of evaporator pressure pull-down is generally designated by reference numeral 460. Differential amplifier 462 compares the evaporator outlet pressure signal on line 354 with a reference voltage corresponding to 240 kPa and operates to disable the rate determining circuitry 460 when the evaporator outlet pressure is less than 240 kPa.

Operational amplifier 470 is connected so as to differentiate the evaporator outlet pressure signal on line 354 and thereby operates to determine the rate of evaporator outlet pressure pull-down. The output of operational amplifier 470 is thus an analog voltage and is applied via line 476 to the (+) input of operational amplifier 480. The other input of operational amplifier 480 is provided by potentiometer 482 which is connected between the 6.2 volt power supply and ground potential. The tap 484 of potentiometer 482 is movable to pick off a voltage corresponding to a reference rate of evaporator pressure pull-down (such as 10 kPa/second) and such voltage is applied through resistor 486 to the (−) input of operational amplifier 480. In normal operation, operational amplifier 480 serves to compare the rate of evaporator pressure pull-down from operational amplifier 470 with the reference rate and to provide a logic 1 voltage potential on output line 490 when the actual pull-down rate is greater than the reference pull-down rate. When the evaporator outlet pressure pull-down rate is less than the reference pull-down rate, output line 490 of operational amplifier 480 falls to a logic 0 voltage potential. The output of NOR gate 434 is fed back via lines 492 and 494 to increase the reference pull-down rate and thereby effectively disable the rate detecting circuit 460 when the six-cylinder mode of operation is engaged. Diode 496 serves to prevent the reference voltage at potentiometer 482 from directly influencing the conduction of transistor 390.

NOR gates 500 and 502 form a latch generally designated by reference numeral 504. The output of NOR gate 500 is the output of latch 504 and is connected via line 508 as an input to NOR gate 432. As indicated above, latch 504 operates in conjunction with NOR gate 432 following initial engagement of compressor clutch 18 to detect the evaporator outlet pressure pull-down rate and to engage the six-cylinder mode of operation if such rate is slower than the reference rate of 10 kPa/second. The output pulse of one shot 452 on line 454 inhibits such operation for a predetermined time following the initial engagement of clutch 18 to allow adequate time for the evaporator outlet pressure signal to achieve steady state operation. Operational amplifier 462 compares the evaporator outlet pressure on line 354 with the 240 kPa pressure reference from potentiometer 420 and inhibits the operation of latch 504 when the evaporator outlet pressure is less than 240 kPa.

In view of the above description, it will be seen that the circuit of FIG. 5 operates to control solenoid coils 358 and 240 in the manner specified by the flow diagram of FIG. 3. As an example of the operation of the control circuit shown in FIG. 5, a description of the circuit operation for the load conditions presented in FIG. 4 will now be given. When the air conditioning system is initially engaged at time $T_0$ by the closure of switch 352, solenoid coil 358 is energized to engage clutch 18 and solenoid coil 240 is energized to unload the rear cylinders of compressor 10. The energization of solenoid coil 358 is due to circuit 380 which senses that the evaporator outlet pressure exceeds 310 kPa. The energization of solenoid coil 240 is due to comparator circuit 400 which senses that the evaporator outlet pressure exceeds 240 kPa. The output pulse of one shot 452 on line 454 ensures that the output of latch 504 on line 508 is maintained at a logic 0 voltage potential for a predetermined time. In this way, the rate determining circuit 460 is ineffective during the period of the output pulse to cause a shift from the three-cylinder mode of operation to the six-cylinder mode of operation.

When the RC time constant of one shot 452 has expired, the output pulse on line 454 is terminated, permitting the rate determining circuit to change the output state of latch 504 provided (1) the evaporator outlet pressure exceeds 240 kPa (as determined by operational amplifier 462) and (2) the evaporator outlet pressure rate of pull-down is slower than the reference rate of 10 kPa/second. In the graph of FIG. 4, time $T_1$ represents the point at which the rate determining circuit 460 changes the output state of latch 504. As a result, the output logic levels of NOR gates 432–436 change state, reverse biasing transistor 390 to de-energize solenoid coil 240. Such de-energization serves to load the rear cylinders of compressor 10, thereby engaging the six-cylinder mode of operation. As shown in FIG. 4, the subsequent operation of compressor 10 in the fully loaded or six-cylinder mode of operation, brings about a more rapid decrease in the evaporator outlet pressure as designated by reference numeral 302. A such time, feedback lines 492 and 494 from NOR gate 434 serve to increase the reference pressure rate to a rate much higher than that represented by curve 302 so that rate determining circuit 460 is ineffective to change the state of latch 504. When the evaporator outlet pressure decreases below 240 kPa, the output of differential amplifier 462 rises to a logic 1 voltage potential also making rate determining circuit ineffective to change the state of latch 504.

When the evaporator outlet pressure drops below 190 kPa, comparator circuit 400 operates to sink bias current from resistor 398, lowering terminal 396 to a logic 0 voltage potential. Such 0 logic level ripples through logic gates 430–436 and resistor 438 to render transistor 390 conductive, thereby engaging the three-cylinder mode of operation. As noted in reference to FIG. 4, the evaporator outlet pressure under such conditions begins to rise as indicated by reference numeral 304.

When the evaporator outlet pressure reaches 240 kPa, the output of comparator circuit 400 rises to a logic 1 voltage potential and such voltage potential ripples through logic gates 430–436 and resistor 438 to reverse bias transistor 390 thereby de-energizing solenoid coil 240 to engage the six-cylinder mode of operation. Consequently, the evaporator outlet pressure decreases as indicated by reference numeral 308 until such pressure falls below 190 kPa at which time comparator circuit 400 again changes state to resume three-cylinder operation.

When the load conditions are changed significantly so that the evaporator outlet pressure falls to 170 kPa as at time $T_5$ in FIG. 4, comparator circuit 380 sinks the external biasing current from resistor 382 to reverse bias transistor 374, thereby de-energizing solenoid coil 358 to disengage compressor clutch 18. At such time, the evaporator outlet pressure begins to rise as indicated by reference numeral 312. In addition, the logic 1 voltage potential at junction 444 serves to forward bias transistor 390 thereby energizing solenoid coil 240 to unload the rear cylinders of compressor 10. As noted before, this operation ensures that the compressor 10 will be unloaded when the compressor clutch is re-engaged. Such operation also serves to restore the reference pressure rate to the normal value of 10 kPa/second. When the evaporator outlet pressure rises above 240 kPa, the output of operational amplifier 462 falls to a logic 0 voltage potential enabling the rate determining circuit to change the state of latch 504, but an increasing rate of change of pressure is ineffective to do so.

When the evaporator outlet pressure reaches 310 kPa at time $T_6$, the output of comparator circuit 380 switches to a high impedance state enabling the external bias current through resistor 382 to forward bias transistor 374, thereby energizing solenoid coil 358 to engage electromagnetic clutch 18. At such point, the compressor 10 is operating in the three-cylinder mode of operation and the evaporator outlet pressure begins to decrease as designated in FIG. 4 by reference numeral 314. Also, at such time, the output pulse of one shot 452 prevents rate determining circuit 460 from changing the state of latch 504 for the duration of its period. When such period expires and until the evaporator outlet pressure falls below 240 kPa, the rate determining circuit 460 is free as described before to change the state of latch 504 to engage the six-cylinder mode of operation if the pressure pull-down rate is slower than the reference rate of 10 kPa/second.

Operation of the air conditioning system is continued in the manner described above, cycling the compressor clutch 18 on and off and cycling between the three- and six-cylinder modes of operation while the compressor is on until the air conditioning system is disabled by the opening of switch 352.

In light of the above, it will be seen that the control system of this invention achieves the control objectives initially set forth herein by sensing the evaporator outlet pressure as an indication of the cooling demand or load and by judiciously controlling the compressor capacity in accordance therewith.

The objective of preventing full displacement six-cylinder cycling is achieved by ensuring that the unloadable compressor cylinders are unloaded when the compressor is turned on and off. With respect to compressor turn-on, the unloaded mode of operation is maintained by NOR gate 434 and one-shot 452. With respect to compressor turn-off, comparator 400 unloads the rear cylinders at an evaporator outlet pressure of 240 kPa—prior to the turn-off pressure of 310 kPa.

The objectives of maximizing air conditioning performance and permitting continuous operation in the unloaded state so long as air conditioning performance is satisfactory are achieved by bringing the compressor to full capacity when a sufficiently high cooling demand or load is sensed and by returning to the unloaded state when the demand is satisfied. Shortly after compressor operation is started (assuming that the evaporator outlet pressure is greater than 240 kPa), the rate of decrease of the evaporator outlet pressure is sensed and compared to a reference rate corresponding to a minimum level of satisfactory air conditioning performance. If the rate of decrease is at least as fast as the reference rate, continued three-cylinder operation is permitted. If the rate of decrease is slower than the reference rate, the compressor is brought to full capacity for improved performance. Once the evaporator outlet pressure has been decreased to a predetermined low level, such as 190 kPa, the compressor is cycled between its unloaded and fully loaded states to maintain the evaporator outlet pressure between 190 kPa and 240 kPa.

The third control objective of minimizing cycling between unloaded and fully loaded states is achieved through the proper choice of the upper and lower compressor displacement cycling pressure limits of 190 kPa and 240 kPa. The compressor turn-off pressure reference of 170 kPa and turn-on pressure reference of 310 kPa correspond to the evaporator outlet pressures typically present at the cycling limits currently used in conventionally controlled air conditioning systems. The lower displacement cycling limit (190 kPa) is set slightly higher than the compressor turn-off pressure reference (170 kPa), and the upper displacement cycling pressure limit of 240 kPa is chosen relative to the lower displacement cycling pressure limit so that the difference therebetween prevents continuous three-six-three displacement cycling while permitting full displacement or six-cylinder performance as soon as needed to provide a desired level of passenger comfort. In this way, the operation of the compressor is controlled to correlate its capacity with the cooling demand and to thereby maximize the efficiency and fuel economy improvement over a conventional fixed capacity control arrangement.

It will, of course, be recognized that the control system of this invention may be implemented with a programmed microprocessor in lieu of the control circuit depicted in FIG. 5 and that in such case, the flow diagram depicted in FIG. 3 outlines the logic decisions to be performed by a suitable computer program.

While this invention has been described in reference to specific embodiments, it will be understood that various modifications in addition to those suggested above may occur to those skilled in the art and that such modifications may come within the scope of this invention as defined in the appended claims.

The embodiments of the invention in which an exclusive property or privilege is claimed are defined as follows:

1. In an air conditioning system having a compressor which is driven through a selectively engageable clutch and has at least one cylinder which is selectively unloadable, a cylinder unloading control system comprising pressure sensing means for sensing refrigerant pressure in the system, clutch engagement sensing means for sensing clutch engagement and cylinder unloading control means to effect unloading of said one cylinder when the compressor is started with engagement of the clutch regardless of the system pressure and to thereafter maintain unloading thereof so long as the system pressure (1) exceeds a first predetermined value and (2) does not decrease with time above a predetermined rate and (3) the clutch remains engaged, and to effect loading of said one cylinder when either the system pressure falls below a second predetermined value substantially less than said first predetermined value or the clutch is disengaged.

2. In an automotive air conditioning system including a multiple cylinder refrigerant compressor that is cycled on and off through a selectively engageable clutch according to the change in refrigerant pressure in the system, at least one of the cylinders having associated therewith an unloading mechanism including an unloading valve and an actuating chamber therefor adapted to be connected to either the suction side or the discharge side of said compressor, the unloading valve being movable when the clutch is engaged to (1) a first position with respect to said cylinder to enable unloading of the same to establish a part capacity mode of operation when said suction side of said compressor is connected to the actuating chamber, or (2) a second position with respect to said cylinder to enable loading of the same to establish a full capacity mode of operation when the discharge side of said compressor is connected to said actuating chamber, apparatus for controlling the capacity of said compressor comprising:

control means effective when said selectively engageable clutch is disengaged for connecting the suction side of said compressor to said actuating chamber so that when said compressor is cycled on, the unloading valve moves with respect to said cylinder to unload the same, whereby the part capacity mode of operation is established when the compressor is cycled on regardless of the refrigerant pressure in the system, said control means including means effective a predetermined time after the cycling on of said compressor for connecting the discharge side of said compressor to said actuating chamber to thereby establish the full capacity mode of operation if the time rate of refrigerant pressure change is slower than a reference value corresponding to a minimum level of satisfactory air conditioning performance.

3. In an automotive air conditioning system including an evaporator and a multiple cylinder refrigerant compressor that is cycled on and off through a selectively engageable clutch according to the change in refrigerant pressure in the evaporator, at least one of the cylinders having associated therewith an unloading mechanism including an unloading valve and an actuating chamber therefor adapted to be connected to either the suction side or the discharge side of said compressor, the unloading valve being movable when the clutch is engaged to (1) a first position with respect to said cylinder to enable unloading of the same to establish a part capacity mode of operation when said suction side of said compressor is connected to the actuating chamber, or (2) a second position with respect to said cylinder to enable loading of the same to establish a full capacity mode of operation when the discharge side of said compressor is connected to said actuating chamber, apparatus for controlling the capacity of said compressor comprising:

control means including first means effective when said selectively engageable clutch is disengaged for connecting the suction side of said compressor to said actuating chamber so that when said compressor is cycled on, the unloading valve moves with respect to said cylinder to unload the same, whereby the part capacity mode of operation is established when the compressor is cycled on regardless of the refrigerant pressure in the evaporator, second means effective when the clutch is engaged for selectively connecting the suction or discharge sides of said compressor to the actuating chamber to thereby establish said full or part capacity modes of operation in a manner to maintain the refrigerant pressure in said evaporator between upper and lower reference pressures, and third means effective when the clutch is engaged and the refrigerant pressure in the evaporator is at least as great as said upper reference pressure for connecting the discharge side of said compressor to said actuating chamber to thereby establish the full capacity mode of operation if the time rate of evaporator refrigerant pressure decrease is slower than a reference value corresponding to a minimum level of satisfactory air conditioning performance.

* * * * *